(12) United States Patent (10) Patent No.: US 11,782,826 B2
Durham et al. (45) Date of Patent: *Oct. 10, 2023

(54) SECURITY CHECK SYSTEMS AND METHODS FOR MEMORY ALLOCATIONS

(71) Applicant: Intel Corporation, Santa Clara, CA (US)

(72) Inventors: David M. Durham, Beaverton, OR (US); Michael LeMay, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,933

(22) Filed: Dec. 1, 2021

(65) Prior Publication Data

US 2022/0156180 A1 May 19, 2022

Related U.S. Application Data

(63) Continuation of application No. 16/998,912, filed on Aug. 20, 2020, now Pat. No. 11,216,366.

(Continued)

(51) Int. Cl.
*G06F 12/02* (2006.01)
*G06F 12/0853* (2016.01)
(Continued)

(52) U.S. Cl.
CPC ........ *G06F 12/0246* (2013.01); *G06F 9/5016* (2013.01); *G06F 11/1068* (2013.01);
(Continued)

(58) Field of Classification Search
CPC ............ G06F 12/0246; G06F 12/0223; G06F 12/0853; G06F 12/0871; G06F 9/5016; G06F 11/1068
(Continued)

(56) References Cited

U.S. PATENT DOCUMENTS 9,015,824 B1 4/2015 Drewry et al.
9,135,450 B2 9/2015 Grobman et al.
(Continued)

FOREIGN PATENT DOCUMENTS

EP 3745273 A1 12/2020
KR 101754518 B1 7/2017
(Continued)

OTHER PUBLICATIONS

EPO; Extended European Search Report issued in EP Patent Application No. 22153425.8, dated Jul. 18, 2022; 8 pages.
PCT International Preliminary Report on Patentability issued in PCT/US2020/067072, dated Aug. 25, 2022; 8 pages.
(Continued)

*Primary Examiner* — Than Nguyen
(74) *Attorney, Agent, or Firm* — Alliance IP, LLC (57) ABSTRACT

A memory controller is to store a unique tag at the mid-point address within each of allocated memory portions. In addition to the tag data, additional metadata may be stored at the mid-point address of the memory allocation. For each memory access operation, an encoded pointer contains information indicative of a size of the memory allocation as well as its own tag data. The processor circuitry compares the tag data included in the encoded pointer with the tag data stored in the memory allocation. If the tag data included in the encoded pointer matches the tag data stored in the memory allocation, the memory operation proceeds. If the tag data included in the encoded pointer fails to match the tag data stored in the memory allocation, an error or exception is generated.

25 Claims, 6 Drawing Sheets

Related U.S. Application Data (60) Provisional application No. 62/976,319, filed on Feb. 13, 2020.

(51) Int. Cl.
  *G06F 11/10* (2006.01)
  *G06F 9/50* (2006.01)
  *G06F 21/60* (2013.01)
  *G06F 12/0871* (2016.01)

(52) U.S. Cl.
  CPC ...... *G06F 12/0223* (2013.01); *G06F 12/0853* (2013.01); *G06F 12/0871* (2013.01); *G06F 21/602* (2013.01)

(58) Field of Classification Search
  USPC .......................................................... 711/170
  See application file for complete search history.

(56) References Cited

U.S. PATENT DOCUMENTS

| | | | |
|---|---|---|---|
| 9,390,268 B1 | 7/2016 | Martini et al. | |
| 9,436,847 B2 | 9/2016 | Durham et al. | |
| 9,753,754 B2 | 9/2017 | Howell et al. | |
| 9,830,162 B2 | 11/2017 | LeMay | |
| 9,954,950 B2 | 4/2018 | LeMay et al. | |
| 10,326,744 B1 | 6/2019 | Nossik et al. | |
| 10,706,164 B2 | 7/2020 | LeMay et al. | |
| 10,785,028 B2 | 9/2020 | Girkar et al. | |
| 10,860,709 B2 | 12/2020 | LeMay et al. | |
| 11,216,366 B2* | 1/2022 | Durham | G06F 11/1048 |
| 11,403,234 B2 | 8/2022 | Durham et al. | |
| 11,416,624 B2 | 8/2022 | Durham et al. | |
| 2002/0065993 A1 | 5/2002 | Chauvel | |
| 2005/0010804 A1 | 1/2005 | Bruening et al. | |
| 2006/0080553 A1 | 4/2006 | Hall | |
| 2007/0192592 A1 | 8/2007 | Goettfert et al. | |
| 2007/0220500 A1 | 9/2007 | Saunier | |
| 2008/0205651 A1 | 8/2008 | Goto et al. | |
| 2008/0229425 A1 | 9/2008 | Perrin et al. | |
| 2008/0288785 A1 | 11/2008 | Rao et al. | |
| 2008/0320601 A1 | 12/2008 | Linsley | |
| 2009/0249064 A1 | 10/2009 | Atley et al. | |
| 2010/0122088 A1 | 5/2010 | Oxford | |
| 2010/0281273 A1 | 11/2010 | Lee et al. | |
| 2013/0191649 A1 | 7/2013 | Muff et al. | |
| 2013/0232507 A1 | 9/2013 | Farrugia et al. | |
| 2013/0283396 A1 | 10/2013 | Langer et al. | |
| 2014/0020092 A1 | 1/2014 | Davidov | |
| 2014/0149730 A1 | 5/2014 | Joshi et al. | |
| 2015/0032996 A1 | 1/2015 | Koeberl et al. | |
| 2015/0381358 A1 | 12/2015 | Grobman et al. | |
| 2016/0092702 A1 | 3/2016 | Durham et al. | |
| 2016/0292422 A1 | 10/2016 | Hayashi et al. | |
| 2016/0335187 A1 | 11/2016 | Greenspan et al. | |
| 2016/0364341 A1 | 12/2016 | Banginwar et al. | |
| 2016/0371496 A1 | 12/2016 | Sell | |
| 2016/0380772 A1 | 12/2016 | Gopal et al. | |
| 2017/0063547 A1 | 3/2017 | Brandt et al. | |
| 2017/0093567 A1 | 3/2017 | Gopal et al. | |
| 2017/0235957 A1 | 8/2017 | Maletsky | |
| 2017/0237560 A1 | 8/2017 | Mueller et al. | |
| 2017/0249260 A1 | 8/2017 | Sahita et al. | |
| 2017/0300425 A1 | 10/2017 | Meredith et al. | |
| 2017/0308297 A1 | 10/2017 | Roberts et al. | |
| 2017/0344297 A1* | 11/2017 | Woolman | G06F 3/0685 |
| 2017/0364704 A1 | 12/2017 | Wright et al. | |
| 2018/0046576 A1 | 2/2018 | Lesartre et al. | |
| 2018/0082057 A1 | 3/2018 | LeMay et al. | |
| 2018/0268170 A1 | 9/2018 | Li et al. | |
| 2019/0044927 A1 | 2/2019 | Sood et al. | |
| 2019/0102322 A1 | 4/2019 | Chhabra et al. | |
| 2019/0227951 A1 | 7/2019 | Durham et al. | |
| 2019/0339978 A1 | 11/2019 | Wallach | |
| 2019/0377574 A1 | 12/2019 | Weimer | |
| 2020/0050553 A1 | 2/2020 | Hajj et al. | |
| 2020/0089430 A1* | 3/2020 | Kanno | G06F 3/0679 |
| 2020/0125501 A1 | 4/2020 | Durham et al. | |
| 2020/0125770 A1 | 4/2020 | LeMay et al. | |
| 2020/0159676 A1 | 5/2020 | Durham et al. | |
| 2020/0201789 A1 | 6/2020 | Durham et al. | |
| 2020/0241775 A1 | 7/2020 | Breslow | |
| 2020/0249995 A1* | 8/2020 | Wong | G06F 9/544 |
| 2020/0379902 A1 | 12/2020 | Durham et al. | |
| 2020/0380140 A1 | 12/2020 | Medwed et al. | |
| 2020/0382303 A1 | 12/2020 | Girkar et al. | |
| 2021/0200673 A1 | 7/2021 | Gupta et al. | |
| 2021/0240638 A1 | 8/2021 | Deutsch et al. | |
| 2021/0405896 A1 | 12/2021 | Durham et al. | |
| 2022/0012188 A1 | 1/2022 | Durham et al. | |
| 2022/0206958 A1 | 6/2022 | LeMay et al. | |
| 2022/0382885 A1 | 12/2022 | Durham et al. | |

FOREIGN PATENT DOCUMENTS

| | | |
|---|---|---|
| WO | 2013147794 A1 | 10/2013 |
| WO | 2014059438 A2 | 4/2014 |
| WO | 2021162792 A1 | 8/2021 |
| WO | 2022139850 | 6/2022 |

OTHER PUBLICATIONS

Ainsworth, Sam et al., "MarkUs: Drop-in use-after-free prevention for low-level languages," 2020 IEEE Symposium on Security and Privacy, Cambridge, UK (14 pages).

Carlini, Nicholas, et al.; "Control-Flow Bending: On the Effectiveness of Control-Flow Integrity," Proceedings of the 24th USENIX Security Symposium; Washington, D.C.; Aug. 2015; 16 pages.

Carr, Scott A. et al., "DataShield: Configurable Data Confidentiality and Integrity," Purdue University, Asia CCS, '17, Apr. 2-6, 2017, Abu Dhabi, United Arab Emirates (12 pages).

Durham, David M., et al.; U.S. Appl. No. 17/791,000, filed Jul. 6, 2022.

EPO; Office Action issued in EP Patent Application No. 20210029. 3, dated Mar. 16, 2022; 4 pages.

GitHub.com; "V8 Garbage Collector," Oct. 23, 2018 (13 pages).

Haraken@, et al.,; "MTECheckedPtr" Last updated Jul. 9, 2020; Accessed Jul. 19, 2022; Retrieved from https://docs.google.com/document/d/1ph7iOorkGqTuETFZp-xvHV4L2rYootuz1ThzAAoGe30/edit#heading=h.b57m9s7iv7yr; 9 pages.

Hong, H. et al., "Data-Oriented Programming: On the Expressiveness of Non-Control Data Attacks," IEEE S&P, 18 pages, 2016.

Intel; "Intel 64 and IA-32 Architectures Software Developer's Manual," vol. 1: Basic Architecture, Chapter 3: Basic Execution Environment; Oct. 2019; 57 pages.

Intel; "Intel 64 and IA-32 Architectures Software Developer's Manual," vol. 1: Basic Architecture, Chapter 6: Procedure Calls, Interrupts, and Exceptions; Oct. 2019; 48 pages.

Intel; "Intel 64 and IA-32 Architectures Software Developer's Manual," vol. 3: System Programming Guide, Chapter 6; Oct. 2019; 110 pages.

L. Muscariello et al., "Hybrid Information-Centric Networking draft-muscariello-intarea-hicn-00," Cisco Systems, Inc., Jun. 7, 2018 (21 pages).

Mohamed et al., "A scheme for implementing address translation storage buffers," Proceedings of the 2002 IEEE Canadian Conference on Electrical and Computer Engineering, 2002, pp. 626-632.

Notice of Allowance, U.S. Appl. No. 16/024,259, dated May 20, 2020, 20 pages.

Notice of Allowance, U.S. Appl. No. 16/728,928, dated Feb. 22, 2021, 10 pages.

Notice of Allowance, U.S. Appl. No. 17/321,087, dated Apr. 13, 2022, 13 pages.

Notice of Allowance, U.S. Appl. No. 17/321,087, dated May 4, 2022, 9 pages.

Watson et al., Capability Hardware Enhanced RISC Instructions (CHERI): Notes on the Meltdown and Spectre Attacks, University of Campbridge Computer Laboratory, Feb. 2018, 16 pages.

(56) References Cited

OTHER PUBLICATIONS

Watson, Robert N.M., et al., "Capability Hardware Enhanced RISC Instructions: CHERI Instruction-Set Architecture (Version 8)," University of Cambridge Computer Laboratory Technical Report No. 951, Cambridge, UK; Oct. 2020 (590 pages).
Xia, Hongyan et al., "CHERIvoke: Characterising Pointer Revocation using CHERI Capabilities for Temporal Memory Safety," MICRO-52, Oct. 2019, Columbus, OH, US (13 pages).
Yan, Z., et al., "Hardware translation coherence for virtualized systems," 2017 3 ACM/IEEE 44th Annual International Symposium on Computer Architecture (ISCA), 2017, pp. 430-443, doi: 10.1145/3079856.3080211. {Year: 2017}.
PCT International Search Report and Written Opinion issued in PCT/US2020/067076, dated Sep. 9, 2021; 11 pages.
EPO; Extended European Search Report issued in EP Patent Application No. 20210029.3, dated May 20, 2021; 8 pages.
Haraken@; "CheckedPtr2 and CheckedPtr3," retrieved from the Internet at https://docs.google.com/document/d/14TsvTgswPUOQuQoI9TmkFQnuSaFD8ZLHRvzapNwl5vs; published Apr. 4, 2020; 8 pages.
Kim, Yonghae, et al.; "Hardware-based Always-On Heap Memory Safety," 2020 53rd Annual IEEE/ACM International Symposium on Microarchitecture (MICRO); Athens, Greece; 14 pages.
Myoung Jin Nam, Periklis Akritidis, and David J Greaves. 2019. FRAMER: a tagged-pointer capability system with memory safety applications. In Proceedings of the 35th Annual Computer Security Applications Conference (ACSAC 19), Association for Computing Machinery, New York, NY, USA, 612-626, https://doi.org/10.1145/3359789.3359799.
PCT International Search Report and Written Opinion issued in PCT/US2020/067072, dated May 26, 2021; 13 pages.
Non-Final Office Action received in U.S. Appl. No. 16/998,913, dated Jan. 25, 2023, 13 pages.
Dutch Office Action received in Application No. 2029792, dated Mar. 22, 2023, with Statement of Relevance, 15 pages.
L. Fiorin, G. Palermo, S. Lukovic, V. Catalano and C. Silvano, "Secure Memory Accesses on Networks-on-Chip," in IEEE Transactions on Computers, vol. 57, No. 9, pp. 1216-1229, Sep. 2008, doi: 10.1109/TC.2008.69; 14 pages.
France Intellectual Property Office; Search Report issued in FR2114288, dated Jan. 12, 2023; 24 pages with English translation.
USPTO Non-Final Office Action for U.S. Appl. No. 17/481,405 dated Feb. 16, 2023, entitled, Cryptographic Computing Including Enhanced Cryptographic Addresses (19 pages).
USPTO Non-Final Office Action for U.S. Appl. No. 17/485,213 dated Feb. 14, 2023, entitled, Object and Cacheline Granularity Cryptographic Memory Integrity (19 pages).

\* cited by examiner

SECURITY CHECK SYSTEMS AND METHODS FOR MEMORY ALLOCATIONS

CROSS-REFERENCE TO RELATED APPLICATIONS

This Application is a continuation and claims the benefit of priority to U.S. patent application Ser. No. 16/998,912 filed on Aug. 20, 2020, entitled "SECURITY CHECK SYSTEMS AND METHODS FOR MEMORY ALLOCATIONS," which application claims benefit to U.S. Provisional Patent Application Ser. No. 62/976,319, filed Feb. 13, 2020, entitled "Security Check Systems and Methods for Memory Allocations," the entire contents of which are incorporated by reference herein.

TECHNICAL FIELD

The present disclosure relates to memory safety, more specifically to deterministically locating metadata pertaining to a memory allocation within the memory allocation.

BACKGROUND

Memory tagging technology is a memory safety mechanism designed to prevent buffer overruns, overflows, and use after free exploits. Typically, the technology uses a repeating memory tag for every data block. For example, in systems using a 16 byte memory block, a 1 byte tag is associated with each memory block. Thus, a 16 GB memory allocation may require an additional 1 GB simply to store the tag data—resulting in gigabytes of wasted memory and performance impacts due to multiple redundant memory accesses to retrieve the tag metadata.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications, and variations thereof will be apparent to those skilled in the art.

DETAILED DESCRIPTION

The systems and methods described herein provide systems, methods, and computer readable media containing instructions that store tag metadata associated with a memory allocation at the mid-point of the memory allocation. Using the 16 GByte example from above, using traditional tag metadata, would require 1 GByte of additional memory space to repeatedly store the tag metadata for each 16 Byte sub portion of the allocation. The systems and methods disclosed herein beneficially reduce this memory requirement to a single byte located at the middle memory address within the 16 GB memory allocation, a billion-fold decrease in memory required to store the tag metadata. The tag metadata may then be hidden from software by the system processor circuitry, providing a contiguous memory when incrementing the linear/virtual address or index across the extent of the memory allocation, with the processor skipping over the metadata and adjusting the physical address accordingly.

The middle or center of a memory allocation bounding box is determined by the memory controller circuitry using a best-fit power of two pointer encoding. The tag metadata may be encoded only once per memory allocation, located at the midpoint of the allocation's bounding box, and is hidden by the processor circuitry such that the memory circuitry appears as a contiguous allocation to software using the encoded pointer. The systems and methods disclosed herein use pointer encoding to determine the midpoint of a memory allocation's power of two bounding box. The tag metadata associated with the entire memory allocation is then stored about the determined midpoint location. The C++ New or C malloc function (or similar) of the memory allocator library takes the tag metadata size into account and adjusts (increases) the memory allocation accordingly to accommodate the tag metadata size and any additional metadata such as the allocation's true size. Because the metadata is stored in the middle of the allocation, the processor circuitry hides the existence of the tag metadata by skipping over the tag metadata value and adding the size of the tag metadata to memory accesses physical addresses past the midpoint based on pointer encoding when accessing memory circuitry via the pointer. Meanwhile, the processor will be able to directly determine the location of the metadata in memory for the allocation based on the pointer encoding.

The systems and methods disclosed herein benefit from the realization that a power of two encoding of the allocation size will have a best fit bounding box midpoint value that is always located within the memory allocation. Beneficially, multiple memory allocations may overlap within a larger memory allocation's power of two size, but each of the smaller memory allocations will have different midpoint addresses and each of the smaller memory allocation midpoint values will differ from the larger memory allocation midpoint value. The pointer may include a number of bits (e.g., 6-bits for a 64 bit pointer) to identify the power of two allocation size and a tag value for versioning to prevent use-after-free (UAF). The actual allocated memory bounds (e.g., offset and array size, or actual allocation size to the left and allocation size to the right of the bounding box midpoint) may be encoded into the midpoint metadata and checked by the processor circuitry to ensure a given memory access is performed only within the boundary addresses of the current memory allocation. These bounds may be sized according to the power of two bounding box size identified by the pointer's size field value to optimize memory use, with smaller bounding boxes requiring fewer bytes to encode the allocation's true bounds verses larger allocations requiring additional bytes to encoded the larger allocations true bounds.

Beneficially, the systems and methods disclosed herein reduces memory overhead for storing metadata/tags, while providing performance optimizations. Unlike memory tagging technology (MTT) or memory tagging extensions (MTE), where the processor circuitry may cache one tag per each memory block (16B) comprising an allocation, using the systems and methods disclosed herein, the processor can cache one tag/bounds per allocation, making caching far more effective and reducing memory lookups to fetch metadata form the midpoint of the allocation's power of two bounding box. Likewise, smaller memory allocations (data objects) will likely have the metadata on the same cache line as data, completely avoiding the extra memory lookups from a separate metadata tag table as MTT (aka. data corruption detection DCD) requires.

When allocating memory, MALLOC( )/NEW will simply account for the metadata in the middle of the memory allocation, increasing the allocation size (e.g. by one byte, or two bytes, or more depending on the size of the power of two bounding box and associated metadata size), and setting the tag value in the middle of the memory allocation's power of two bounding box. Then it will return a pointer with the same tag value in it along with the power of two size of the bounding box in the size field. When the processor is accessing the memory with this encoded pointer format, the processor circuitry will look-up the tag value from the middle of the allocation's power of two bounding box and compare with the pointer value, allowing memory access if they match, triggering a fault or exception if they don't match. FREE( ) will then reset the memory tag. Similarly, the processor may use bounds information in the metadata verifying the memory access is within the correct allocation bounds, for example, is within X1 bytes (or other unit of minimum allocation size) from the left of the bounding box midpoint and X2 bytes (or other unit of minimum allocation size) from the right of the midpoint of the bounding box, where tag, X1 and X2 are separate fields of the midpoint metadata.

A memory allocation security check system is provided. The system may include: processor circuitry to execute an application; memory circuitry; memory controller circuitry communicatively coupled to the memory circuitry and to the processor circuitry, the memory controller circuitry to, in response to a memory allocation request by the application: perform a memory allocation operation based on the memory allocation request to obtain a memory allocation; increase a requested memory allocation size based on the memory allocation request by at least one byte; assign tag data to memory allocated based on the memory allocation request; determine a mid-point address of the memory allocation; store the tag data and metadata at the mid-point address of the memory allocation; and communicate the tag data to the processor circuitry.

A non-transitory or transitory storage device is provided. The device may include machine-readable instructions that, when executed by memory controller circuitry, cause the memory controller circuitry to, in response to a memory allocation request by a processor circuitry: increase a requested memory allocation size based on the memory allocation request by at least one byte; assign tag data to memory allocated based on the memory allocation request; determine a mid-point address of the memory allocation based on the memory allocation request; store the tag data and metadata at the mid-point address of the memory allocation; and communicate the tag data to the processor circuitry.

A memory allocation security check system is provided. The system includes means for increasing a requested memory allocation size based on the memory allocation request by at least one byte; means for assigning tag data to memory allocated based on the memory allocation request; means for determining a mid-point address of the memory allocation based on the memory allocation request; means for storing the tag data and metadata at the mid-point address of the memory allocation; and means for communicating the tag data to the processor circuitry.

A memory allocation metadata hiding method is provided. The method may include: increasing a requested memory allocation size based on the memory allocation request by at least one byte; assigning tag data to memory allocated based on the memory allocation request; determining a mid-point address of the memory allocation based on the memory allocation request; storing the tag data and metadata at the mid-point address of the memory allocation; and communicating the tag data to the processor circuitry.

As used herein the terms "top," "bottom," "lowermost," and "uppermost" when used in relationship to one or more elements are intended to convey a relative rather than absolute physical configuration. Thus, an element described as an "uppermost element" or a "top element" in a device may instead form the "lowermost element" or "bottom element" in the device when the device is inverted. Similarly, an element described as the "lowermost element" or "bottom element" in the device may instead form the "uppermost element" or "top element" in the device when the device is inverted.

As used herein, the term "logically associated" when used in reference to a number of objects, systems, or elements, is intended to convey the existence of a relationship between the objects, systems, or elements such that access to one object, system, or element exposes the remaining objects, systems, or elements having a "logical association" with or to the accessed object, system, or element. An example "logical association" exists between relational databases where access to an element in a first database may provide information and/or data from one or more elements in one or more additional databases, each having an identified relationship to the accessed element. In another example, if "A"

is logically associated with "B," accessing "A" will expose or otherwise draw information and/or data from "B," and vice-versa.

As used herein, the terms "first," "second," and other similar ordinals are intended to distinguish a number of similar or identical objects and not to denote a particular or absolute order of the objects. Thus, a "first object" and a "second object" may appear in any order—including an order in which the second object appears before or prior in space or time to the first object. Such configurations should be considered as included within the scope of this disclosure.

Note that in the following discussion specific components are designated using an alphanumeric item designator. For example, a first element may be designated 110A and a second element may be designated 110B. For ease of discussion and conciseness, when describing a feature common to both elements, the alphanumeric designator is omitted. Thus, when such a generic (i.e., non-alphanumeric) designator is used, the described feature should be understood as applicable to all elements sharing a common numeric designator. For example, a feature described with respect to "element 110" would apply to all elements 110A-110n. On the other hand, a feature described with respect to "element 110A" would apply specifically to the element designated 110A and not to elements designated 110B through 110n.

Figure 1:
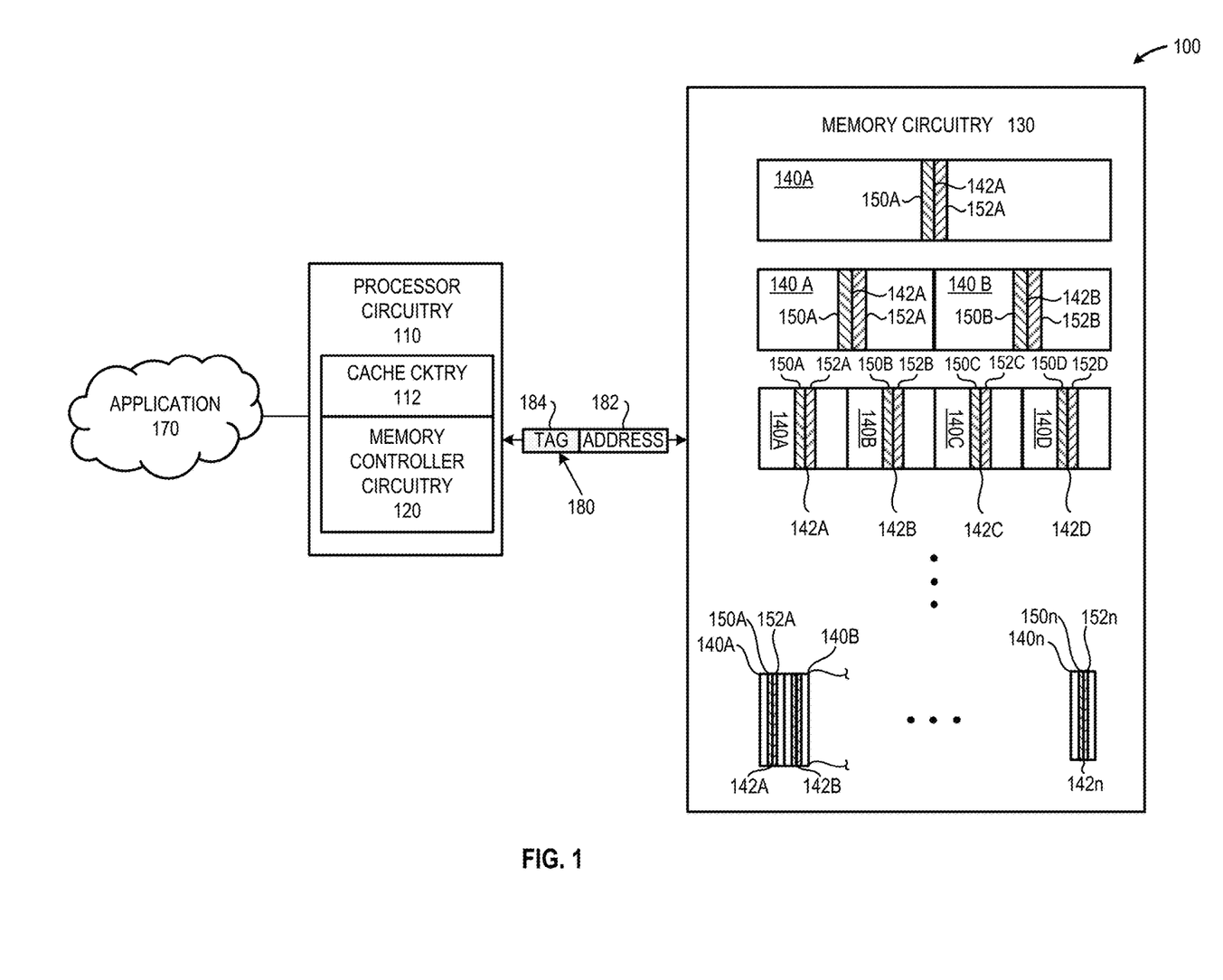
FIG. 1 is a schematic diagram of an illustrative system for performing security checks for memory allocations in which the system includes processor circuitry, memory controller circuitry, and memory circuitry, with memory apportioned into one or more power of two (i.e., $2^0$ to $2^n$ bytes) memory allocation(s) bounding boxes in which the respective virtual/linear address (pointer) encoding identifies said bounding box and may include respective, unique, tag data that is associated with the respective memory allocation and embedded metadata at the midpoint of said bounding box, hidden by the processor from software, in accordance with at least one embodiment described herein.

FIG. 1 is a schematic diagram of an illustrative system 100 for performing security checks on memory allocations and in which the system 100 includes processor circuitry 110, memory controller circuitry 120, and memory circuitry 130 circuitry apportioned into one or more power of two (i.e., $2^0$ to $2^n$) memory allocation(s) 140A-140n in which the respective midpoint address 142A-142n includes respective, unique, tag data 150A-150n that is associated with the respective memory allocation 140A-140n, in accordance with at least one embodiment described herein. FIG. 1 depicts the memory circuitry 130 allocated into a number of sample memory allocations 140A-140n. In embodiments, an instruction that causes the processor circuitry 110 to perform a memory operation causes the memory controller circuitry 120 to access the memory circuitry 130 using a pointer 180 that includes at least data representative of the address of the memory operation 182 and tag data 184 associated with the respective memory allocation 140 containing memory address 182. The tag data 184 is compared to the tag data 150 stored at the midpoint address 142 of the respective memory allocation 140. If the pointer tag data 184 matches the stored tag data 150 within the memory allocation 140, the operation at the designated memory address 182 is permitted. If the pointer tag data 184 fails to match the stored tag data 150 within the memory allocation 140, an exception is returned to the processor 110. Although the memory controller circuitry 120 is depicted in FIG. 1 as a separate box from the processor circuitry 110, in some embodiments, the processor circuitry 110 may include all or a portion of the memory controller circuitry 120. In some embodiments, the processor circuitry 110 may include cache circuitry 112.

The processor circuitry 110 includes any number and/or combination of electrical components, optical components, quantum components, semiconductor devices, and/or logic elements capable of executing machine-readable instructions, such as provided by one or more applications 170. In embodiments, the processor circuitry 110 may include a plurality of processor core circuits. In embodiments, each of processor core circuits may provide one or more physical and/or virtual processor threads. The processor circuitry 110 may include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples the processor circuitry 110 may also be an application specific integrated circuit (ASIC) and at least some modules processor core circuits may be implemented as hardware elements of the ASIC.

As depicted in FIG. 1, in embodiments, the processor circuitry 110 may include memory controller circuitry 120 that includes any number and/or combination of electrical components, optical components, quantum components, semiconductor devices, and/or logic elements capable of performing read and/or write operations to the processor cache circuitry 112 and/or the system memory circuitry 130. In some embodiments, the processor circuitry 110 and/or the memory controller circuitry 120 may include memory management unit circuitry to perform store information and/or data used to provide paginated (e.g., via 4 KB pages) address translations.

In response to execution of an instruction causing a memory access operation, the processor circuitry 110 generates an encoded pointer 180 that includes at least data representative of the memory address 182 involved in the operation and data representative of the tag 184 associated with the memory allocation 140 containing the memory address 182. The encoded pointer 180 may include additional information, such as data representative of the size of the memory allocation 140 and pointer arithmetic as described below in detail with regard to FIG. 2. In embodiments, the memory controller circuitry 120 compares the tag data 184 carried by the encoded pointer 180 with the tag data 150 stored at the midpoint address 142 of the memory allocation 140. If the tag data 184 carried by the encoded pointer 180 matches the tag data 150 stored at the midpoint address 142 of the memory allocation 140, the memory controller circuitry 120 completes the requested operation. If the tag data 184 carried by the encoded pointer 180 fails to match the tag data 150 stored at the midpoint address 142 of the memory allocation 140, the memory controller circuitry 120 returns an exception to the processor circuitry 110.

The system memory circuitry 130 includes any number and/or combination of electrical components, semiconductor devices, optical storage devices, quantum storage devices, molecular storage devices, atomic storage devices, and/or logic elements capable of storing information and/or data. All or a portion of the system memory circuitry 130 may include transitory memory circuitry, such as RAM, DRAM, SRAM, or similar. All or a portion of the system memory circuitry 130 may include non-transitory memory circuitry, such as: optical storage media; magnetic storage media; NAND memory; and similar. The system memory circuitry 130 may include one or more storage devices having any storage capacity. For example, the system memory circuitry 130 may include one or more storage devices having a storage capacity of about: 512 kilobytes or greater; 1 megabyte (MB) or greater; 100 MB or greater; 1 gigabyte (GB) or greater; 100 GB or greater; 1 terabyte (TB) or greater; or about 100 TB or greater.

The memory controller circuitry 120 apportions the memory circuitry 130 into any power of two number of memory allocations 140A-140n. As depicted in FIG. 1, in some embodiments, the memory controller circuitry 120 may apportion the system memory circuitry 130 into a single memory allocation 140A (i.e., a power of two=$2^m$, for a value of m that results in the entire system memory being covered). As depicted in another example apportionment in FIG. 1, in other embodiments, the memory controller circuitry 120 may apportion the system memory circuitry 130 into two memory allocations 140A, 140B (i.e., a power of two=$2^{m-1}$). As depicted in another example apportionment in FIG. 1, in other embodiments, the memory controller circuitry 120 may apportion the system memory circuitry 130 into four memory allocations 140A-140D (i.e., a power of two=$2^{m-2}$). As depicted in another example apportionment in FIG. 1, in other embodiments, the memory controller circuitry 120 may apportion the system memory circuitry 130 into "n" memory allocations 140A-140n (i.e., a power of two=$2^k$ for a value k that results in dividing the system memory into "n" memory allocations). Importantly, note that the center address 142A-142n in each of the memory allocations 140 does not align with the center address 142A-142n in other memory allocations, thereby permitting the storage of tag data 150A-150n that is unique to the respective memory allocation 140A-140n. In embodiments, the tag data 150A-150n may include any number of bits. For example, the tag data 150A-150n may include 4-bits or more, 6-bits or more; 8-bits or more, 16-bits or more, or 32-bits or more.

In embodiments, in addition to the tag data 150A-150n, metadata 152A-152n may also be stored at the center address of each of the memory allocations 140A-140n. In some embodiments, such metadata 152 may include but is not limited to: key, KeyID, tweak value or IV/counter value used by the processor circuitry 110 to encrypt/decrypt data (and/or other metadata) within the respective memory allocation 140. In other embodiments, such metadata 152 may include but is not limited to: an aggregate cryptographic MAC value or ECC code for the data allocation. In such embodiments, the metadata 152 can be used to detect data corruption and may be used for correction of random bit errors. For example, each time a data block is written, the old MAC value based on the previous data value of the block (and location of block) is unrolled (e.g. using an GFMUL or XOR operation) and the new stored value is rolled in (e.g. using a GFMUL or XOR operation, etc.).

The encoded pointer 180 includes the memory address 182 to perform a memory operation (fetch, store, etc.). The memory address 182 may include any number of bits. For example the memory address 182 may include: 8-bits or more; 16-bits or more, 32-bits or more; 48-bits or more; or 64-bits or more. In embodiments, the tag data 184 carried by the encoded pointer 180 may include any number of bits. For example, the tag data 184 may include 4-bits or more, 8-bits or more, 16-bits or more, or 32-bits or more. In embodiments, all or a portion of the address and/or tag data carried by the encoded pointer 180 may be encrypted. In embodiments, the tag data 150A-150n may be loaded as a cache line (e.g., a 32-byte block, 64-byte block, or 128-byte block) into the processor cache circuitry 112. In such embodiments, in performing memory operations on data stored in the processor cache circuitry 112 the memory controller circuitry 120 or other logic, e.g. in processor circuitry 110 or cache circuitry 112, compares the tag data 184 with the tag data 150 stored on the cache line containing the requested memory address.

For memory operations occurring at memory addresses before the middle address 142 of the allocation 140 (i.e., the "hidden" address containing the tag data 150), upon successful verification of the tag data 150 with the tag data 184 associated with the memory allocation 140, the pointer 180 simply performs the operation at the indicated memory address 182. For memory operations occurring at memory addresses after the middle address 142 of the allocation 140, the encoded pointer 180 is offset based on the size of the tag data 150 stored in the memory allocation 140. Thus, the presence of the tag data 150 is "hidden" by the processor circuitry from software having access to the metadata using the encoded pointer 180.

Figure 2:
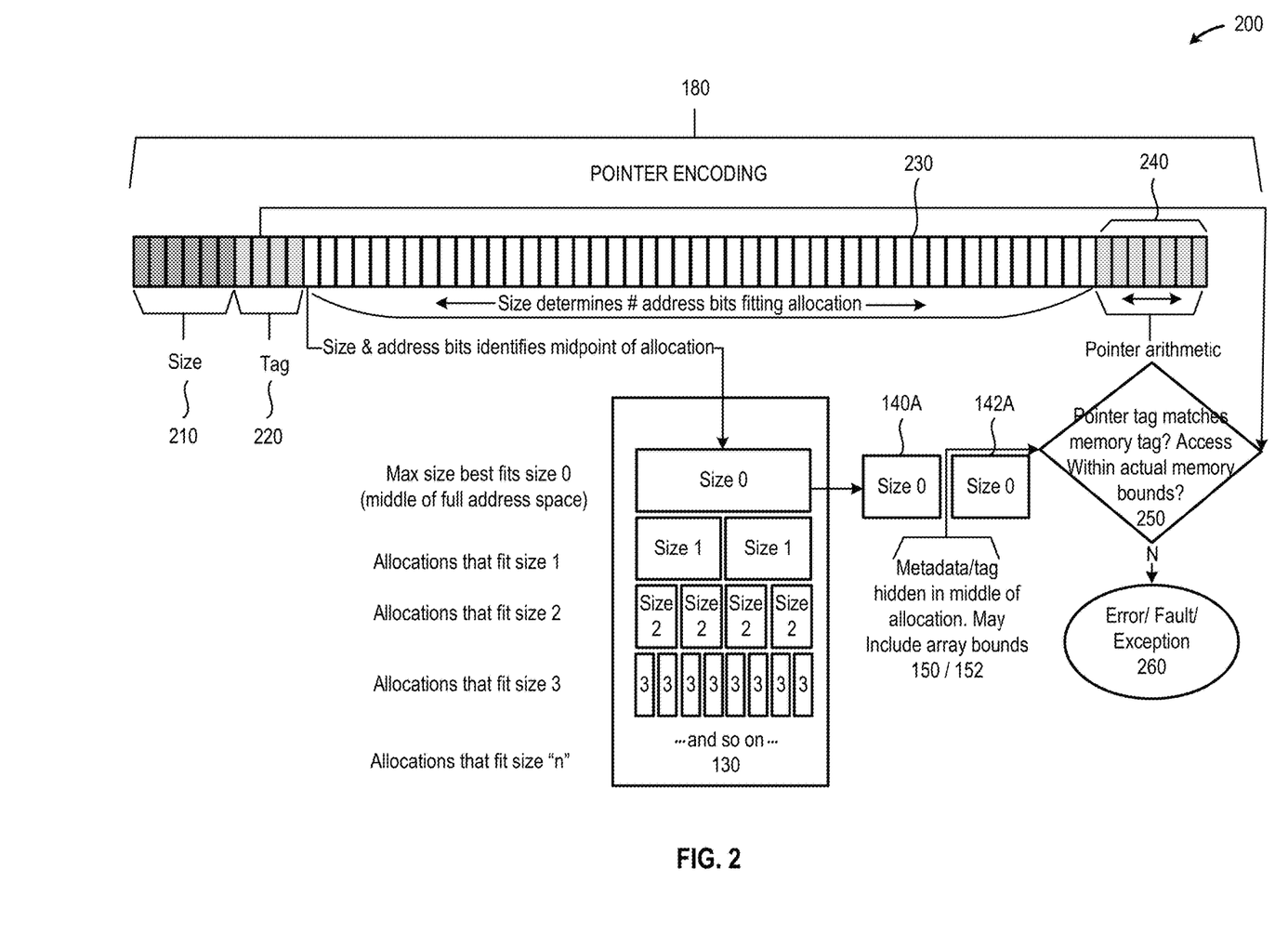
FIG. 2 is a schematic diagram of an illustrative encoded pointer architecture in which the encoded pointer includes a multi-bit memory allocation size field, a multi-bit tag data field, a variable multi-bit address field, and a variable multi-bit pointer arithmetic field, in which the variable fields' extent is determined by the value in the size field, and is used to identify a unique power of two bounding box about which midpoint is located metadata pertaining to a memory allocation, in accordance with at least one embodiment described herein.

FIG. 2 is a schematic diagram of an illustrative encoded pointer architecture 200 in which the encoded pointer 180 includes a multi-bit memory allocation size field 210, a multi-bit tag data field 220, a multi-bit address field 230, and a multi-bit pointer arithmetic field 240, in accordance with at least one embodiment described herein. As depicted in FIG. 2, in embodiments, the encoded pointer 180 may include x86 architecture 64-bit pointer. In other embodiments, the encoded pointer 180 may include a greater (e.g., 128-bits) or lesser (e.g., 16-bits, 32-bits) number of bits. In embodiments, the number of bits used in the address field 230 may be based on the size of the respective memory allocation 140. For example, a larger memory allocation 140 ($2^0$) requires a greater number of address bits than a smaller memory allocation 140 ($2^1$ to $2^n$). The address field 230 may include any number of bits. For example, the address field 230 may accommodate memory addresses having: 8-bits or more; 16-bits or more, 32-bits or more; 48-bits or more; or 64-bits or more.

In embodiments, the size data field 210 may include any number of bits. For example, the size data may include: 2-bits or more; 4-bits or more; 6-bits or more; or 8-bits or more. The size data field 210 provides an indication of the size of the memory allocation 140. The tag data field 230 may include any number of bits. For example, the size data field 210 may include: 4-bits or more, 6-bits or more; 8-bits or more, 16-bits or more, or 32-bits or more. The encoded pointer 160 also includes a pointer arithmetic field 240. The pointer arithmetic field 240 may include any number of bits. For example, the pointer arithmetic field 240 may include: 4-bits or more, 6-bits or more; 8-bits or more, 16-bits or more, or 32-bits or more.

As depicted in FIG. 2, upon execution of an instruction that includes a memory operation, the processor circuitry 110 and/or the memory controller circuitry 120 compares 250 the tag data 184 included in the tag data field 220 with the tag data 150 stored at the middle address 142 of the memory allocation 140. If the tag data 184 included in the tag data field 220 matches the tag data 150 stored at the middle address 142 of the memory allocation 140, the processor circuitry 110 and/or the memory controller circuitry 120 completes the requested memory operation in the system memory circuitry 130. If the tag data 184 included in the tag data field 220 fails to match the tag data 150 stored at the middle address 142 of the memory allocation 140, the memory controller circuitry 120 reports an error, fault, or exception 260 to the processor circuitry 110. In some embodiments, allocation bounds metadata may be included in data 150. In such embodiments, the memory controller circuitry 120 may also check whether the memory access is within the specified bounds.

Figure 3:
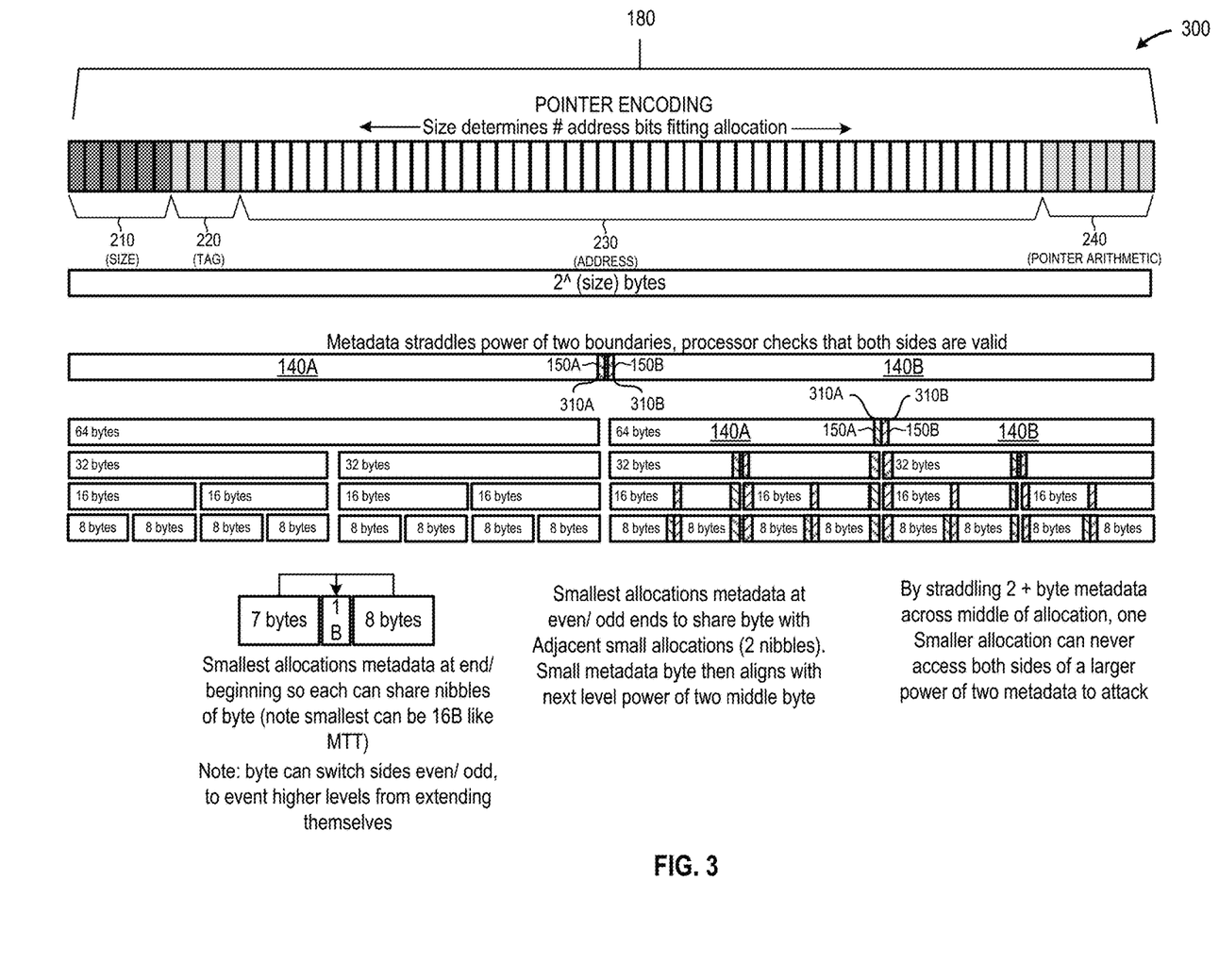
FIG. 3 is a schematic diagram of an illustrative system in which the metadata associated with a first memory allocation includes a first portion and a second portion that extends into a second memory allocation, in accordance with at least one embodiment described herein.

FIG. 3 is a schematic diagram of an illustrative system 300 in which the metadata 184 associated with a first portion of a memory allocation 140A includes a first portion 310A and a second portion 310B that extends into a second portion of a memory allocation 140B, in accordance with at least one embodiment described herein. As depicted in FIG. 3, in embodiments where the system memory circuitry 130 is apportioned into relatively small memory allocations comprising portions 140A and 140B, it is possible that a first metadata portion 310A of the metadata 150 adjacent to the first memory allocation portion 140A extends, as a second metadata portion 310B, into the second memory allocation portion 140B. In such embodiments, the processor circuitry 110 and/or the memory controller circuitry 120 compares the tag data 150A adjacent to the first memory allocation portion 140A with the pointer tag data half 184A and the tag data 150B adjacent to the second memory allocation portion 140B with the pointer tag data 184B.

For larger memory allocations 140A-140n, tag metadata may be larger, replicated and split across the midpoint of the memory allocation power of two bounding box. By replicating the tag metadata on both sides of the midpoint 142A-142n, a smaller allocation 140A-140n will only have access to one tag value and not the other. Thus, the processor circuitry 110 may compare both tags on either side of the midpoint 142 to assure they match before allowing a memory access, preventing manipulation of both larger allocation tag values from a smaller overlapping allocation.

Figure 4:
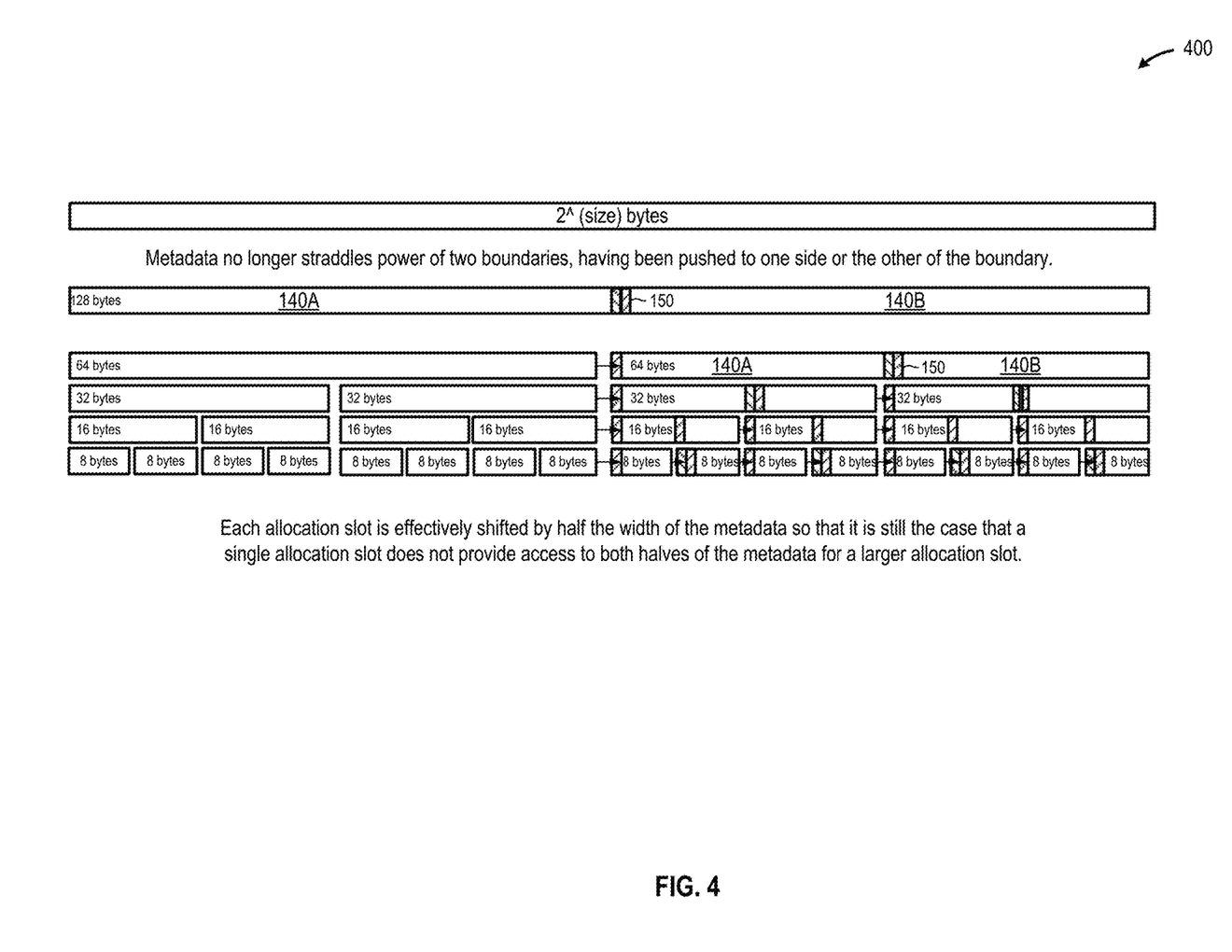
FIG. 4 is a schematic diagram of an illustrative system in which the metadata split across two memory allocations is shifted such that the metadata is contained within a single memory allocation, in accordance with at least one embodiment described herein.

FIG. 4 is a schematic diagram of an illustrative system 400 in which the metadata 184 split across two memory allocations 140A/140B is shifted such that the metadata 184 is contained within a single memory allocation 140, in accordance with at least one embodiment described herein. To prevent the power of two alignments to cause metadata 184 always to be split across cache lines or pages, the address space can be shifted between linear/virtual address and physical addressing. That is, the processor circuitry (e.g. AGU) 110 can simply add a constant (e.g. half of the metadata size) or subtract a constant number shifting the data objects consistently in system memory circuitry 130 in order to prevent the midpoint metadata from straddling caches lines and/or pages. The memory allocator may then take this shifting into account when allocating from the heap.

Figure 5:
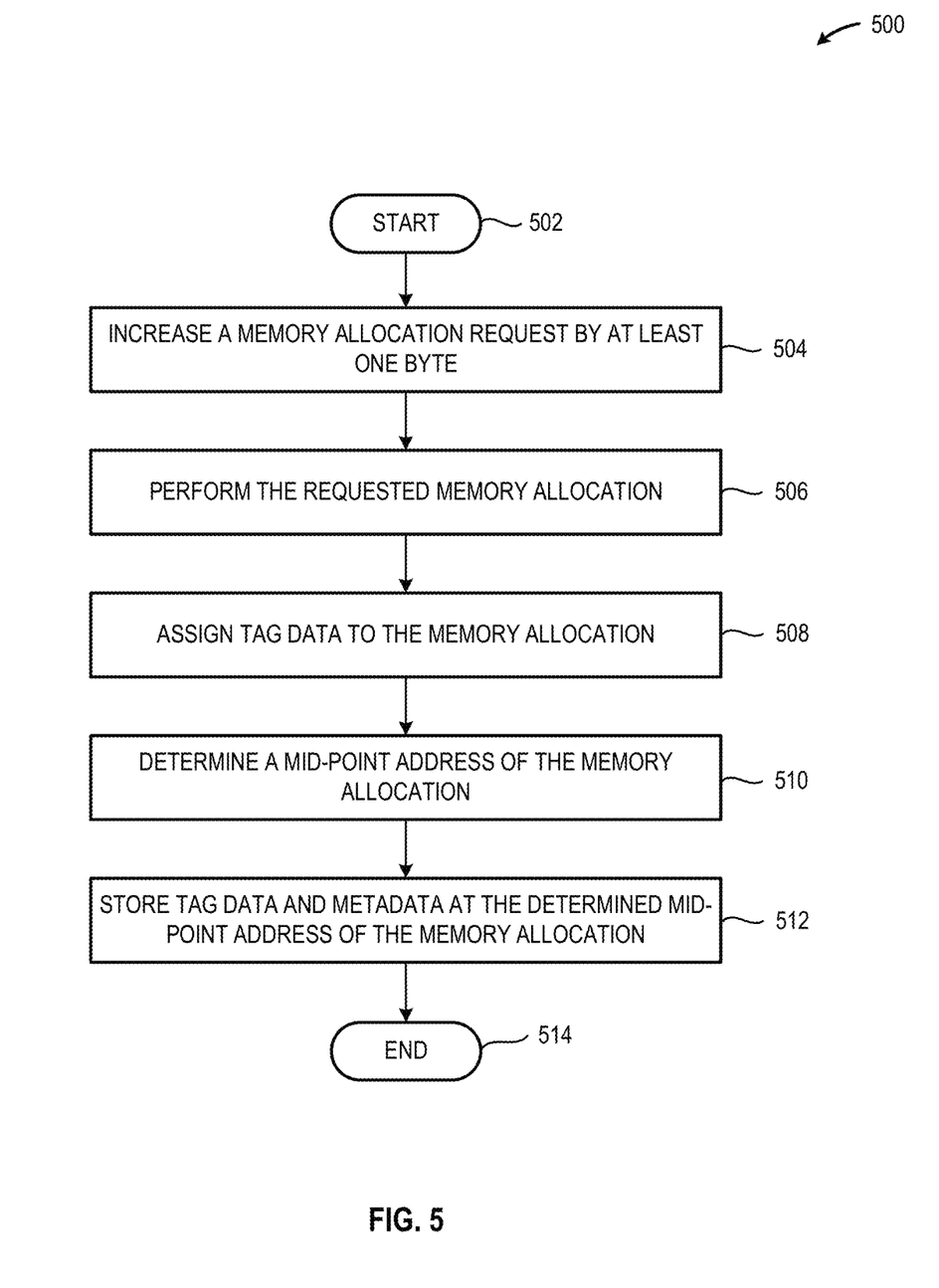
FIG. 5 is a high level flow diagram of an illustrative method allocating memory to accommodate a security check during memory operations, in accordance with at least one embodiment described herein.

FIG. 5 is a high level flow diagram of an illustrative method 500 of performing a memory allocation security check, in accordance with at least one embodiment described herein. The method 500 commences at 502.

At 504, the processor circuitry 110 and/or the memory controller circuitry 120 receives a memory allocation request and increases the requested memory allocation by a number of bytes sufficient to accommodate tag data 150 and metadata 152. In embodiments, the memory allocation request may be increased by: 1-byte or more; 2-bytes or more; 4-bytes or more; 8-bytes or more; 16-bytes or more; or 32-bytes or more.

At 506, the processor circuitry 110 and/or the memory controller circuitry 120 performs the requested memory allocation operation.

At 508, the processor circuitry 110 and/or the memory controller circuitry 120 assigns tag data 150 to the allocated memory 140.

At 510, the processor circuitry 110 and/or the memory controller circuitry 120 determines a mid-point address 142 of the memory allocation 140.

At 512, the processor circuitry 110 and/or the memory controller circuitry 120 stores the tag data 150 at the determined mid-point address of the memory allocation 140. The method concludes at 514.

Figure 6:
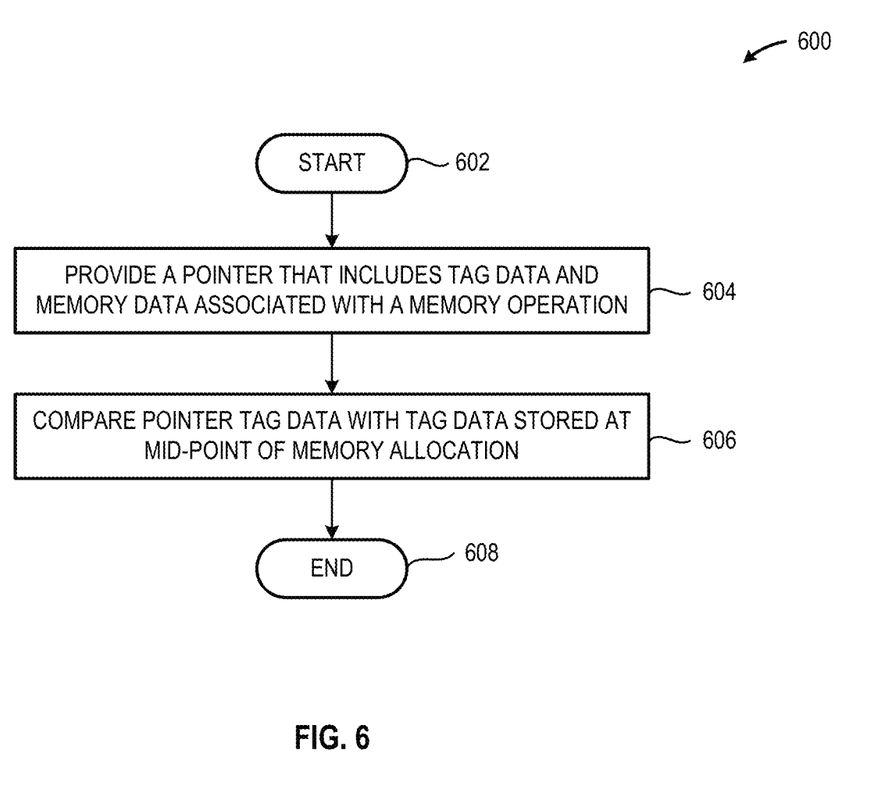
FIG. 6 is a high level flow diagram of an illustrative method of performing a security check prior to performing a memory operation, in accordance with at least one embodiment described herein.

FIG. 6 is a high level flow diagram of an illustrative method 600 of performing a security check prior to performing a memory operation, in accordance with at least one embodiment described herein. The method 600 commences at 602.

At 604, the processor circuitry 110 provides to the memory controller circuitry 120 a pointer that includes tag data and metadata associated with a memory operation.

At 606, the processor circuitry 110 and the memory controller circuitry 120 compares the tag data received with the pointer against the tag data stored at the mid-point of the memory allocation associated with the received address data to determine whether the pointer tag data matches the tag data stored at the mid-point of the memory allocation. The method concludes at 608.

In embodiments, the memory allocation security check systems discussed with regard to FIGS. 1-6 may additionally or alternatively be implemented as a compiler-based system rather than implemented by processor circuitry 110 and/or memory controller circuitry 120. Implementing a compiler-based security check system may beneficially take advantage of compiler based functionality such as Intel Architecture instruction features. For example, Intel Architecture supports Scale-Index-Base (SIB)+displacement memory operand, which allows us to avoid branches (which can be slow) when emulating the systems and methods described above in a compiler. A branchless approach (assume that RAX contains the decoded address for current access, i.e. with no size bits, and that RDI contains the address of the midpoint):

CMP % RDI, % RAX//Compare address to midpoint

SETGE % RBX//Set RBX to 1 if the address is above the midpoint or 0 otherwise

MOV 24(% RAX, % RBX, 8), % RDX//If RBX is 1, then add 8 to the address (assuming for this discussion that the metadata slot is always 8 bytes in length), otherwise don't adjust it. The displacement of 24 could be an offset to a struct field, and subsequent accesses to different fields could have different displacements. Without SIB+displacement, a branch may be needed to decide whether to add 8 to the address when accessing past the midpoint in an object.

In embodiments, the memory allocation security check systems discussed with regard to FIGS. 1-6 may additionally or alternatively be implemented as a deterministic use-after-reallocation mitigation. A Use-After-Reallocation (UAR) exploit involves the following steps:

1. Pointer P1 is generated to a new allocation A1.
2. Allocation A1 is freed.
3. Allocation A2 is generated, which overlaps with the storage previously used for allocation A1.
4. Pointer P1 is dereferenced, which results in allocation A2 being accessed. This can result in data in allocation A2 being disclosed to the adversary, or it can be one step in a larger exploit, e.g. by overwriting a data field in allocation A2 that enables an adversary to disclose information in some other way.

The systems and methods disclosed with regard to FIGS. 1-6 beneficially enable deterministic mitigation (i.e. mitigating all possible instances) of UAR as follows. In embodiments, identifying all pointers 180 as well as all valid (i.e. non-freed) metadata slots 152A-152n. For example, this can be accomplished by storing a tag bit alongside each unit of memory (e.g. 8 byte-aligned chunk) that may store a pointer 180 or metadata 152A-152n. The deterministic use-after-REALLOC mitigation beneficially distinguishes pointers 180 and metadata 152 from data in system memory circuitry 130.

Distinguishing pointers 180 from metadata 152 may be accomplished by storing multiple tag bits such that separate tag values are assigned for pointers vs. metadata. Additionally or alternatively, metadata can be encoded such that it never overlaps a valid pointer value, so that a single tag bit will suffice. The processor can then check each tagged value to see whether it is in the format of a pointer or metadata. In embodiments, tagged pointers can only be modified by special instructions that make sure the pointers do not go outside the bounds specified in the metadata for the allocation identified by the pointer.

In embodiments, allocator circuitry within the processor circuitry 110 and/or memory controller circuitry 120 may be modified. In embodiments, the allocator circuitry may quarantine memory allocation slots when they are deallocated. In embodiments, the allocator circuitry may maintain a sorted set of encoded pointers specifying the quarantined allocation slots. The allocator circuitry may detect inefficiencies or impossibilities in attempting to satisfy incoming allocation requests and perform a sweep to clear the quarantine list partially or fully. In embodiments allocator circuitry may detect when the quarantine list makes it impossible to satisfy an allocation request, but it is more complex to detect when inefficiencies reach some threshold. Some possible indicators of inefficiency include:
1. The allocator needs to request an increase in heap memory even though a large amount of total free heap memory still exists, just in a form that cannot be used to satisfy incoming requests due to quarantine requirements.
2. The allocator is spending a lot of time walking through the quarantine list while searching for an available allocation slot.

In embodiments, a sweep algorithm can perform a linear scan through memory for pointers and check for each pointer whether it points to a valid region by checking the corresponding LIM metadata. All that needs to be checked during the sweep is whether the midpoint identifying by the pointer contains valid LIM metadata. The allocator circuitry immediately invalidates the metadata slot for an allocation when it frees that allocation, e.g. by clearing the associated tag bit. If a pointer is discovered that references a quarantined allocation, then its tag bit will be cleared.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for performing a security check on memory allocation. In response to receipt of a memory allocation request, processor circuitry allocates system memory on a power-of-two basis (e.g., allocate the memory circuitry into $2^0$ to $2^n$ portions). The processor circuitry stores a unique tag at the mid-point address within each of the allocated memory portions. In addition to the tag data, additional metadata may be stored at the mid-point address of the memory allocation. For each memory access operation, an encoded pointer contains information indicative of a size of the memory allocation as well as tag data. The processor circuitry compares the tag data included in the encoded pointer with the tag data stored at the mid-point of the memory allocation. If the tag data included in the encoded pointer matches the tag data stored at the mid-point of the memory allocation, the memory operation proceeds. If the tag data included in the encoded pointer fails to match the tag data stored at the mid-point of the memory allocation, an error or exception is generated.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for providing a heatsink having a first, deformable, portion for use with electronic devices.

Example 1 includes a memory allocation security check system, comprising: processor circuitry to execute an application; memory circuitry; memory controller circuitry communicatively coupled to the memory circuitry and to the processor circuitry, the memory controller circuitry to, in response to a memory allocation request by the application: perform a memory allocation operation based on the memory allocation request to obtain a memory allocation; increase a requested memory allocation size based on the memory allocation request by at least one byte; assign tag data to memory allocated based on the memory allocation request; determine a mid-point address of the memory allocation; store the tag data and metadata at the mid-point address of the memory allocation; and communicate the tag data to the processor circuitry.

Example 2 includes the subject matter of Example 1, and optionally, wherein the tag data is first tag data, the memory controller circuitry to further, in response to a memory operation request by the processor circuitry: provide a pointer that includes second tag data and memory address data received from the processor circuitry and based on the memory operation request; and determine whether the second tag data received from the processor circuitry matches the first tag data stored at the mid-point address of the memory allocation that corresponds to the memory address data received from the processor circuitry.

Example 3 includes the subject matter of Example 2, and optionally, the memory controller circuitry to further responsive to a determination that the second tag data included in the pointer matches the first tag data stored at the mid-point address of the memory allocation, perform a memory operation corresponding to the memory allocation request at a memory address corresponding to the memory address data included in the pointer.

Example 4 includes the subject matter of Example 3, and optionally, the memory controller circuitry to responsive to a determination that the memory address data included in the pointer represents an address prior to the mid-point address of the memory allocation, perform the memory operation at the memory address corresponding to the memory address data included in the pointer.

Example 5 includes the subject matter of Example 4, and optionally, the memory controller circuitry to responsive to a determination that the memory address data included in the pointer represents an address after the mid-point address of the memory allocation, generate a new memory address by adding an offset to the memory address corresponding to the memory address data included in the pointer; and perform the memory operation at the new memory address.

Example 6 includes the subject matter of Example 2, and optionally, the memory controller circuitry to further generate an exception responsive to a determination that the second tag data included in the pointer does not match the first tag data stored at the mid-point address of the memory allocation.

Example 7 includes the subject matter of Example 1 wand optionally, herein the memory allocation comprises at least one 16-byte memory block.

Example 8 includes the subject matter of Example 1 wand optionally, herein the memory control circuitry is to encrypt the first tag data prior to storing the first tag data at the mid-point address of the memory allocation.

Example 9 includes the subject matter of Example 1, and optionally, the memory control circuitry to allocate the memory circuitry as one or more power-of-two memory allocations.

Example 10 includes the subject matter of Example 1 wand optionally, herein the metadata stored at the mid-point address of the memory allocation comprises metadata selected from one or more of: a cryptographic key, a key identifier, a tweak value, a counter value, an aggregate cryptographic Media Access Control (MAC) value, and an Error Correction Code (ECC).

Example 11 includes a non-transitory tangible storage device that includes machine-readable instructions that, when executed by memory controller circuitry, cause the memory controller circuitry to, in response to a memory allocation request by a processor circuitry: increase a requested memory allocation size based on the memory allocation request by at least one byte; assign tag data to memory allocated based on the memory allocation request; determine a mid-point address of the memory allocation based on the memory allocation request; store the tag data and metadata at the mid-point address of the memory allocation; and communicate the tag data to the processor circuitry.

Example 12 includes the subject matter of Example 11, and optionally, wherein the tag data is first tag data, and wherein the instructions, when executed by the memory controller circuitry, cause the memory controller circuitry to, in response to a memory operation request by the processor circuitry: provide a pointer that includes second tag data and memory address data received from the processor circuitry and based on the memory operation request; and determine whether the second tag data received from the processor circuitry matches the first tag data stored at the mid-point address of the memory allocation that corresponds to the memory address data received from the processor circuitry.

Example 13 includes the subject matter of Example 12, and optionally, wherein the instructions, when executed by the memory controller circuitry, cause the memory controller circuitry to further: responsive to a determination that the second tag data included in the pointer matches the first tag data stored at the mid-point address of the memory allocation, perform a memory operation corresponding to the memory allocation request at a memory address corresponding to the memory address data included in the pointer.

Example 14 includes the subject matter of Example 13, and optionally, wherein the instructions, when executed by the memory controller circuitry, cause the memory controller circuitry to: responsive to a determination that the memory address data included in the pointer represents an address prior to the mid-point address of the memory allocation, perform the memory operation at the memory address corresponding to the memory address data included in the pointer.

Example 15 includes the subject matter of Example 14, and optionally, wherein the instructions, when executed by the memory controller circuitry, cause the memory controller circuitry to: responsive to a determination that the memory address data included in the pointer represents an address after the mid-point address of the memory allocation, generate a new memory address by adding an offset to the memory address corresponding to the memory address data included in the pointer; and perform the memory operation at the new memory address.

Example 16 includes the subject matter of Example 12, and optionally, wherein the instructions, when executed by the memory controller circuitry, cause the memory controller circuitry to: generate an exception responsive to a determination that the second tag data included in the pointer does not match the first tag data stored at the mid-point address of the memory allocation.

Example 17 includes the subject matter of Example 11 wand optionally, herein the memory allocation comprises at least one 16-byte memory block.

Example 18 includes the subject matter of Example 11 wand optionally, herein the instructions, when executed by the memory controller circuitry, cause the memory controller circuitry to encrypt the first tag data prior to storing the first tag data at the mid-point address of the memory allocation.

Example 19 includes the subject matter of Example 11, and optionally, the memory control circuitry to: allocate a memory circuitry coupled thereto as one or more power-of-two memory allocations.

Example 20 includes the subject matter of Example 11 wand optionally, herein the metadata stored at the mid-point address of the memory allocation comprises metadata selected from one or more of: a cryptographic key, a key identifier, a tweak value, a counter value, an aggregate cryptographic Media Access Control (MAC) value, and an Error Correction Code (ECC).

Example 21 includes a memory allocation security check method, comprising: increasing a requested memory allocation size based on the memory allocation request by at least one byte; assigning tag data to memory allocated based on the memory allocation request; determining a mid-point address of the memory allocation based on the memory allocation request; storing the tag data and metadata at the mid-point address of the memory allocation; and communicating the tag data to the processor circuitry.

Example 22 includes the subject matter of Example 21, and optionally, wherein the tag data is first tag data, the method further including, in response to a memory operation request by the processor circuitry: providing a pointer that includes second tag data and memory address data received from the processor circuitry and based on the memory operation request; and determining whether the second tag data received from the processor circuitry matches the first tag data stored at the mid-point address of the memory allocation that corresponds to the memory address data received from the processor circuitry.

Example 23 includes the subject matter of Example 22, and optionally, further including: responsive to a determination that the second tag data included in the pointer matches the first tag data stored at the mid-point address of the memory allocation, performing a memory operation corresponding to the memory allocation request at a memory address corresponding to the memory address data included in the pointer.

Example 24 includes the subject matter of Example 23, and optionally, further including: responsive to a determination that the memory address data included in the pointer represents an address prior to the mid-point address of the memory allocation, performing the memory operation at the memory address corresponding to the memory address data included in the pointer.

Example 25 includes the subject matter of Example 24, and optionally, further including: responsive to a determination that the memory address data included in the pointer represents an address after the mid-point address of the memory allocation, generating a new memory address by adding an offset to the memory address corresponding to the memory address data included in the pointer; and performing the memory operation at the new memory address.

Example 26 includes the subject matter of Example 22, and optionally, further including: generating an exception responsive to a determination that the second tag data included in the pointer does not match the first tag data stored at the mid-point address of the memory allocation.

Example 27 includes the subject matter of Example 21 wand optionally, herein the memory allocation comprises at least one 16-byte memory block.

Example 28 includes the subject matter of Example 31, and optionally, further including causing the memory controller circuitry to encrypt the first tag data prior to storing the first tag data at the mid-point address of the memory allocation.

Example 29 includes the subject matter of Example 21, and optionally, further including: allocating a memory circuitry coupled thereto as one or more power-of-two memory allocations.

Example 30 includes the subject matter of Example 21, and optionally, wherein the metadata stored at the mid-point address of the memory allocation comprises metadata selected from one or more of: a cryptographic key, a key identifier, a tweak value, a counter value, an aggregate cryptographic Media Access Control (MAC) value, and an Error Correction Code (ECC).

Example 31 includes a memory allocation security check system, comprising: means for increasing a requested memory allocation size based on the memory allocation request by at least one byte; means for assigning tag data to memory allocated based on the memory allocation request; means for determining a mid-point address of the memory allocation based on the memory allocation request; means for storing the tag data and metadata at the mid-point address of the memory allocation; and means for communicating the tag data to the processor circuitry.

Example 32 includes the subject matter of Example 31, and optionally, wherein the tag data is first tag data, the system further including, in response to a memory operation request by the processor circuitry: means for providing a pointer that includes second tag data and memory address data received from the processor circuitry and based on the memory operation request; and means for determining whether the second tag data received from the processor circuitry matches the first tag data stored at the mid-point address of the memory allocation that corresponds to the memory address data received from the processor circuitry.

Example 33 includes the subject matter of Example 32, and optionally, further including: responsive to a determination that the second tag data included in the pointer matches the first tag data stored at the mid-point address of the memory allocation, means for performing a memory operation corresponding to the memory allocation request at a memory address corresponding to the memory address data included in the pointer.

Example 34 includes the subject matter of Example 33, and optionally, further including: responsive to a determination that the memory address data included in the pointer represents an address prior to the mid-point address of the memory allocation, means for performing the memory operation at the memory address corresponding to the memory address data included in the pointer.

Example 35 includes the subject matter of Example 34, and optionally, further including: responsive to a determination that the memory address data included in the pointer represents an address after the mid-point address of the memory allocation, means for generating a new memory address by adding an offset to the memory address corresponding to the memory address data included in the pointer; and means for performing the memory operation at the new memory address.

Example 36 includes the subject matter of Example 32, and optionally, further including: means for generating an exception responsive to a determination that the second tag data included in the pointer does not match the first tag data stored at the mid-point address of the memory allocation.

Example 37 includes the subject matter of Example 31, and optionally, wherein the memory allocation comprises at least one 16-byte memory block.

Example 38 includes the subject matter of Example 31, and optionally, further including means for encrypting the first tag data prior to storing the first tag data at the mid-point address of the memory allocation.

Example 39 includes the subject matter of Example 31, and optionally, further including means for allocating a memory circuitry coupled thereto as one or more power-of-two memory allocations.

Example 40 includes the subject matter of Example 31 wand optionally, herein the metadata stored at the mid-point address of the memory allocation comprises metadata selected from one or more of: a cryptographic key, a key identifier, a tweak value, a counter value, an aggregate cryptographic Media Access Control (MAC) value, and an Error Correction Code (ECC).

Example 41 includes a memory allocation security check system, the system being arranged to perform the method of any of claims 21 through 30.

Example 42 includes a chipset arranged to perform the method of any of claims 21 through 30.

Example 43 includes a non-transitory machine readable medium storing a plurality of instructions that, in response to being executed on a computing device, cause the computing device to carry out the method according to any one of claims 21 through 30.

Example 44 includes a device configured to reduce a noise level present in an audio signal, the device to perform the method of any one of claims 21 through 30.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A computing device including one or more processors to be communicatively coupled to one or more components of a processor circuitry, the one or more processors to:
   perform a memory allocation operation based on a memory allocation request to obtain a memory allocation;
   increase, by at least one byte, a requested memory allocation size based on the memory allocation request;
   assign tag data to memory allocated based on the memory allocation request;
   determine a mid-point address of the memory allocation;
   cause the tag data and metadata to be stored at the mid-point address of the memory allocation; and
   communicate the tag data to the one or more components of the processor circuitry.

2. The computing device of claim 1, wherein the tag data is first tag data, the one or more processors to further, in response to a memory operation request by the one or more components of the processor circuitry:
   provide a pointer that includes second tag data and memory address data received from the one or more components of the processor circuitry and based on the memory operation request; and
   determine whether the second tag data received from the one or more components of the processor circuitry matches the first tag data stored at the mid-point address of the memory allocation that corresponds to the memory address data received from the one or more components of the processor circuitry.

3. The computing device of claim 2, the one or more processors to further:
   responsive to a determination that the second tag data included in the pointer matches the first tag data stored at the mid-point address of the memory allocation, perform a memory operation corresponding to the memory allocation request at a memory address corresponding to the memory address data included in the pointer.

4. The computing device of claim 3, the one or more processors to:
   responsive to a determination that the memory address data included in the pointer represents an address prior to the mid-point address of the memory allocation, perform the memory operation at the memory address corresponding to the memory address data included in the pointer.

5. The computing device of claim 4, the one or more processors to:
   responsive to a determination that the memory address data included in the pointer represents an address after the mid-point address of the memory allocation, generate a new memory address by adding an offset to the memory address corresponding to the memory address data included in the pointer; and
   perform the memory operation at the new memory address.

6. The computing device of claim 2, the one or more processors to further:
   generate an exception responsive to a determination that the second tag data included in the pointer does not match the first tag data stored at the mid-point address of the memory allocation.

7. The computing device of claim 1 wherein the memory allocation comprises at least one 16-byte memory block.

8. The computing device of claim 2, wherein the one or more processors are to encrypt the first tag data prior to storing the first tag data at the mid-point address of the memory allocation.

9. The computing device of claim 1, the one or more processors to perform the memory allocation operation based on one or more power-of-two memory allocations.

10. The computing device of claim 1, wherein the metadata stored at the mid-point address of the memory allocation comprises metadata selected from one or more of: a cryptographic key, a key identifier, a tweak value, a counter value, an aggregate cryptographic Media Access Control (MAC) value, and an Error Correction Code (ECC).

11. The computing device of claim 1, further including the one or more components of the processor circuitry.

12. A non-transitory machine-readable medium storing a plurality of instructions that, in response to being executed on a computing device, cause the computing device to perform operations including:
   sending, from a processor circuitry of the computing device to a memory controller circuitry of the computing device, a memory allocation request corresponding to an application to be executed;
   at the memory controller circuitry:
      increasing a requested memory allocation size based on the memory allocation request by at least one byte;
      assigning tag data to memory allocated based on the memory allocation request;
      determining a mid-point address of the memory allocation based on the memory allocation request;
      storing the tag data and metadata at the mid-point address of the memory allocation; and
      communicating the tag data to the processor circuitry.

13. The non-transitory machine-readable medium of claim 12, wherein the tag data is first tag data, and wherein the operations further include:
   sending a memory operation request from the processor circuitry to the memory controller circuitry; and
   at the memory controller circuitry, in response to the memory operation request by the processor circuitry:
      providing a pointer that includes second tag data and memory address data received from the processor circuitry and based on the memory operation request; and
      determining whether the second tag data received from the processor circuitry matches the first tag data stored at the mid-point address of the memory allocation that corresponds to the memory address data received from the processor circuitry.

14. The non-transitory machine-readable medium of claim 13, wherein the operations further include, responsive to a determination that the second tag data included in the pointer matches the first tag data stored at the mid-point address of the memory allocation, performing a memory operation corresponding to the memory allocation request at a memory address corresponding to the memory address data included in the pointer.

15. The non-transitory machine-readable medium of claim 14, wherein the operations further include:
   responsive to a determination that the memory address data included in the pointer represents an address prior to the mid-point address of the memory allocation, performing the memory operation at the memory address corresponding to the memory address data included in the pointer.

16. The non-transitory machine-readable medium of claim 15, wherein the operations further include:
   responsive to a determination that the memory address data included in the pointer represents an address after the mid-point address of the memory allocation, generating a new memory address by adding an offset to the memory address corresponding to the memory address data included in the pointer; and
   performing the memory operation at the new memory address.

17. The non-transitory machine-readable medium of claim 13, wherein the operations further include generating an exception responsive to a determination that the second tag data included in the pointer does not match the first tag data stored at the mid-point address of the memory allocation.

18. The non-transitory machine-readable medium of claim 12, wherein the memory allocation comprises at least one 16-byte memory block.

19. The non-transitory machine-readable medium of claim 13, wherein the operations further include encrypting the first tag data prior to storing the first tag data at the mid-point address of the memory allocation.

20. The non-transitory machine-readable medium of claim 12, wherein the operations further include allocating a memory circuitry coupled thereto as one or more power-of-two memory allocations.

21. A method to be performed at a computing device including processor circuitry and a memory controller circuitry communicatively coupled to the processor circuitry, the method including:
   sending, from the processor circuitry to the memory controller circuitry, a memory allocation request corresponding to an application to be executed;
   at the memory controller circuitry:
      increasing a requested memory allocation size based on the memory allocation request by at least one byte;
      assigning tag data to memory allocated based on the memory allocation request;
      determining a mid-point address of the memory allocation based on the memory allocation request;
      storing the tag data and metadata at the mid-point address of the memory allocation; and
   communicating the tag data to the processor circuitry.

22. The method of claim 21, wherein the tag data is first tag data, and wherein the method further includes:
   sending a memory operation request from the processor circuitry to the memory controller circuitry; and
   at the memory controller circuitry, in response to the memory operation request by the processor circuitry:
      providing a pointer that includes second tag data and memory address data received from the processor circuitry and based on the memory operation request; and
      determining whether the second tag data received from the processor circuitry matches the first tag data stored at the mid-point address of the memory allocation that corresponds to the memory address data received from the processor circuitry.

23. The method of claim 22, wherein the method further includes, responsive to a determination that the second tag data included in the pointer matches the first tag data stored at the mid-point address of the memory allocation, performing a memory operation corresponding to the memory allocation request at a memory address corresponding to the memory address data included in the pointer.

24. The method of claim 23, wherein the method further includes, responsive to a determination that the memory address data included in the pointer represents an address prior to the mid-point address of the memory allocation, performing the memory operation at the memory address corresponding to the memory address data included in the pointer.

25. The method of claim 21, further including allocating a memory circuitry coupled thereto as one or more power-of-two memory allocations.

* * * * *